(No Model.)
G. W. STOCKMAN.
APPARATUS FOR COOLING AIR.
No. 260,060. Patented June 27, 1882.
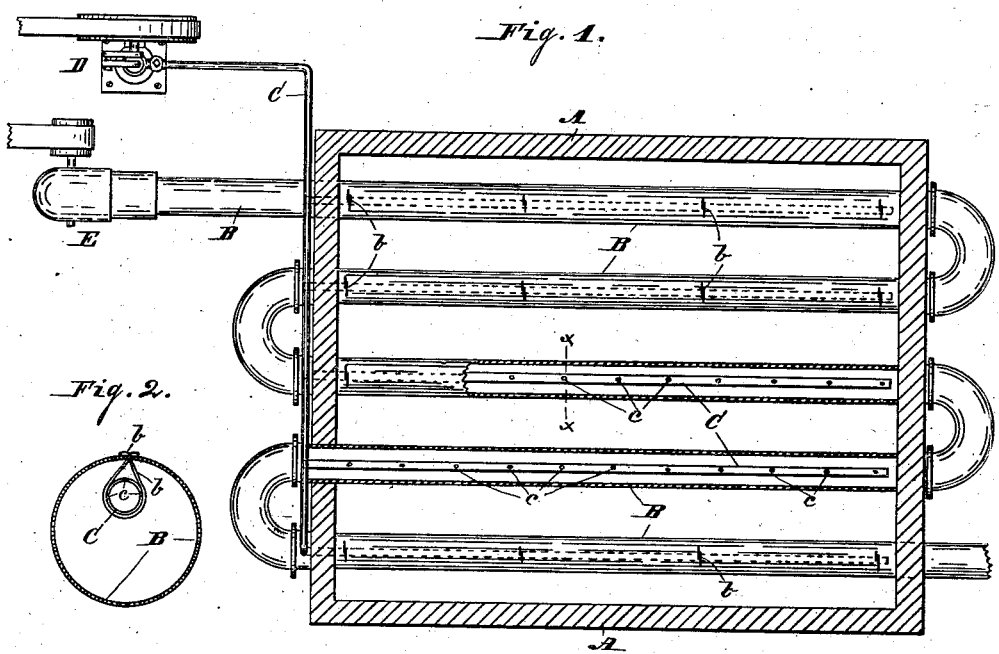
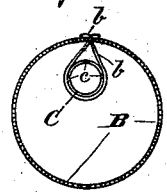
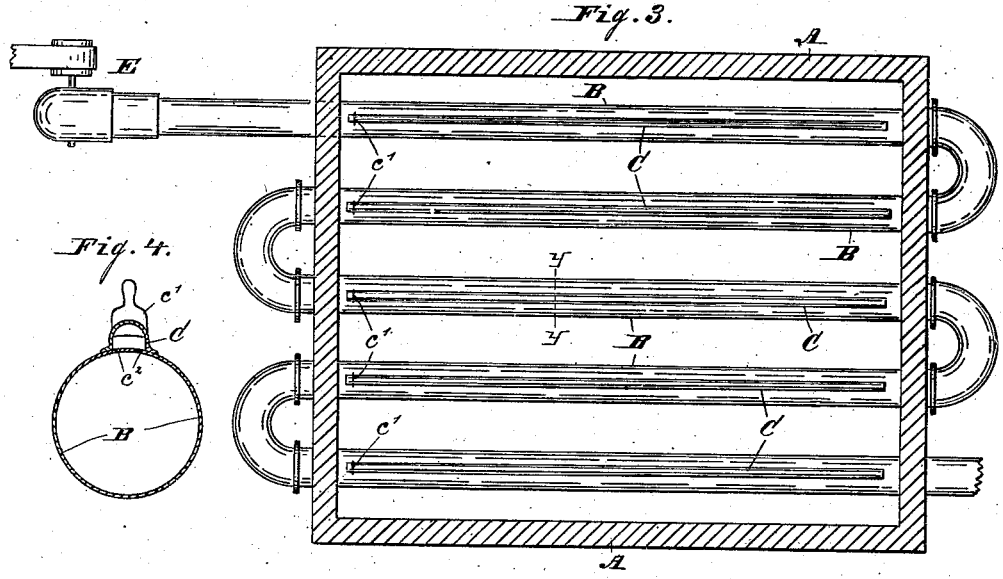
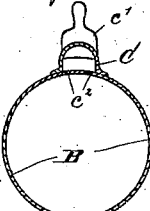
WITNESSES:
Chas. S. Spritz.
James B. Lyisu.
INVENTOR:
Geo. W. Stockman
by C. P. Jacobs
Atty.

UNITED STATES PATENT OFFICE.

GEORGE W. STOCKMAN, OF INDIANAPOLIS, INDIANA.

APPARATUS FOR COOLING AIR.

SPECIFICATION forming part of Letters Patent No. 260,060, dated June 27, 1882.

Application filed November 5, 1881. (No model.)

*To all whom it may concern:*

Be it known that I, GEORGE W. STOCKMAN, of Indianapolis, Indiana, have invented a new and useful Improvement in Air-Coolers, of which the following is a specification.

My invention belongs to that class of air-cooling apparatus wherein the air is forced by a fan or blower through pipes immersed in a refrigerating-liquid. The tendency is to congeal the moisture on the inside of the air-pipe, and at length the accumulation of ice will close up the pipe entirely. I obviate this by using a double set of pipes, the one conveying air and the other brine. Thus, in Figure 1, A is a transverse section of a vat inclosing a coil of pipe, B, attached to a fan or blower at E. D is a force-pump, to which a small pipe, C, is attached, which is connected with each return of the pipe B by branches which pass down to and then horizontally through the pipes B, and are perforated, as indicated by $c$. The brine is forced through the pipe C and into the perforated branch pipes $c$, and sprays out through the perforations and mingles with the air in the incasing-pipe B, preventing its congealing.

Fig. 2 is a cross-section of pipes B and C, showing method of suspension and perforation $c$.

Fig. 3 illustrates another method of incasing the pipes so as to effect the same result. It shows a transverse section of the vat A and coil of pipe B for conducting the air from the blower E; but in this the brine-pipe is placed on the outside and top of the air-pipe, and the latter is perforated to allow the spray from the brine-pipe to enter it and come in contact with the air. This is clearly shown in Fig. 4, which is a cross-section of the air-pipe B and brine-pipe C, with perforations $c^2$.

I am aware of the method shown in Letters Patent granted to S. D. Lount, March 28, 1876, where he sprays the outside of the air-pipe from a vat or tank, A, and do not claim this, but regard my invention, wherein I reach the air on the inside of the exterior pipe, B, by perforations in the brine-pipe or the air-pipe itself, as a decided improvement, producing a better result.

What I claim, and desire to secure by Letters Patent, is—

1. In an apparatus for cooling air, an exterior pipe for conducting a refrigerating-liquid, in combination with an air-pipe through which the air to be cooled is forced, and so arranged that the liquid shall enter the air-pipe through perforations in the latter.

2. In an apparatus for cooling air, an incasing-pipe through which air to be cooled is forced, in combination with an interior pipe having perforations and conveying refrigerating-liquid, for the purposes above set forth.

3. In an air-cooling apparatus, a pipe through which air is forced, in combination with a vat for submerging the air-pipe, and means for conducting a refrigerating-liquid into the air-pipe to prevent the moisture from congealing therein.

In witness whereof I have hereunto set my hand this 31st day of October, 1881.

GEORGE W. STOCKMAN.

Witnesses:
C. J. JACOBS,
WALTER S. HARRISON.